(12) United States Patent
Kim et al.

(10) Patent No.: US 8,737,758 B2
(45) Date of Patent: May 27, 2014

(54) APPARATUS AND METHOD OF REDUCING NOISE

(75) Inventors: Gyu Won Kim, Gyunggi-do (KR); Ho Seop Jeong, Gyunggi-do (KR); In Taek Song, Gyunggi-do (KR); Kyoung Joong Min, Seoul (KR); Tae Hyeon Kwon, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 379 days.

(21) Appl. No.: 13/118,691

(22) Filed: May 31, 2011

(65) Prior Publication Data
US 2012/0057796 A1    Mar. 8, 2012

(30) Foreign Application Priority Data
Sep. 7, 2010    (KR) .................. 10-2010-0087394

(51) Int. Cl.
*G06K 9/40*    (2006.01)
(52) U.S. Cl.
USPC ........... 382/260; 382/261; 382/262; 382/263; 382/264; 382/265; 382/266; 382/272
(58) Field of Classification Search
USPC ........................................ 382/260–266, 272
See application file for complete search history.

(56) References Cited

U.S. PATENT DOCUMENTS

| | | | |
|---|---|---|---|
| 5,359,676 A * | 10/1994 | Fan ............................... | 382/246 |
| 6,625,326 B1 | 9/2003 | Cho | |
| 7,515,209 B2 | 4/2009 | Hsu | |
| 7,589,771 B2 * | 9/2009 | Hosaka et al. ................. | 348/252 |
| 7,894,685 B2 * | 2/2011 | Zhai et al. ...................... | 382/266 |
| 8,090,215 B2 * | 1/2012 | Schweid ......................... | 382/275 |
| 8,180,169 B2 * | 5/2012 | Schweid ......................... | 382/260 |
| 2007/0296871 A1 | 12/2007 | Yoo et al. | |
| 2009/0141998 A1 * | 6/2009 | Kubo et al. ..................... | 382/264 |
| 2009/0214131 A1 * | 8/2009 | Schweid ......................... | 382/263 |

(Continued)

FOREIGN PATENT DOCUMENTS

| KR | 20010009865 A | 2/2001 |
|---|---|---|
| KR | 10-0843084 B1 | 7/2008 |
| KR | 20100056658 A | 5/2010 |

OTHER PUBLICATIONS

Sang Ju Park et al., "Blocking-Noise Reduction Algorithm for JPEG compressed Image Using Multi-Scale Analysis," Hongik University Institute of Science and Technology (1998).

(Continued)

*Primary Examiner* — Jayesh A Patel
(74) *Attorney, Agent, or Firm* — Lowe Hauptman & Ham, LLP (57) ABSTRACT

An apparatus of reducing noise includes: an edge determining module determining whether each pixel of an image corresponds to an edge; a low pass filter module performing low pass filtering of the image in two directions and performing low pass filtering only for the pixel determined not to be the edge; a filter selecting module selecting a filter having a flexible size to be applied to a mask region for each of the images low pass filtered based on the average brightness of the entire region and the average brightness of the mask region having a predetermined size; a sigma filter module sigma filtering the mask region using the selected filter for each of the images low pass filtered; and an averaging module averaging the image sigma filtered in the two directions.

10 Claims, 6 Drawing Sheets

(56) References Cited

U.S. PATENT DOCUMENTS

2009/0257673 A1* 10/2009 Schweid ............... 382/261
2009/0257674 A1* 10/2009 Schweid ............... 382/263
2009/0257675 A1* 10/2009 Schweid ............... 382/263
2010/0002951 A1* 1/2010 Zhai et al. ............ 382/266

OTHER PUBLICATIONS

Korean Office Action 10-2010-0087394 issued Jul. 28, 2011.

* cited by examiner

APPARATUS AND METHOD OF REDUCING NOISE

CROSS-REFERENCE TO RELATED APPLICATIONS

This application claims the priority of Korean Patent Application No. 10-2010-0087394 filed on Sep. 7, 2010, in the Korean Intellectual Property Office, the disclosure of which is incorporated herein by reference.

BACKGROUND OF THE INVENTION

1. Field of the Invention

The present invention relates to an apparatus and a method of reducing noise, and more particularly, to an apparatus and a method of reducing noise capable of adaptively reducing noise by applying a flexible sigma filter having different sizes for each area in consideration of the brightness or direction of an image.

2. Description of the Related Art

Recently, due to the development of a digital device, a circumferential image may be easily photographed anytime, anywhere, using a digital camera, a cellular phone, or the like. These devices, such as a digital camera or a cellular phone, capable of photographing an image, include an image sensor for photographing the image therein.

In the case in which image data photographed using this image sensor includes noise, when displaying the photographed image data, an accurate image may not be output. Accordingly, currently, research into effectively reducing the noise of image data so as to output an accurate image is in progress.

Particularly, in the case of an image photographed at night, noise reduction is performed without considering brightness or direction of the image, such that an edge is damaged or the image becomes entirely blurred.

SUMMARY OF THE INVENTION

An aspect of the present invention provides an apparatus and a method of reducing noise capable of adaptively reducing the noise for each area in consideration of the brightness or direction of an image.

In addition, another aspect of the present invention provides an apparatus and a method of reducing noise capable of preventing loss of an edge due to blurring of the image through a pre-processing process which determines whether each pixel is the edge in a plurality of directions and performs low-pass filtering only for the pixel determined not to be the edge.

According to an aspect of the present invention, there is provided an apparatus of reducing noise, including: an edge determining module determining whether each pixel of an image corresponds to an edge; a low pass filter module performing low pass filtering of the image in two directions, i.e., vertical and horizontal directions and performing low pass filtering only for the pixel determined not to be the edge; a filter selecting module selecting a filter having a flexible size to be applied to a mask region for each of the images low pass filtered in the two directions based on the average brightness of the entire region and the average brightness of the mask region having a predetermined size; a sigma filter module sigma filtering the mask region using the selected filter for each of the images low pass filtered in the two directions; and an averaging module averaging the image sigma filtered in the two directions.

The edge determining module may determine whether each pixel corresponds to the edge in a plurality of directions based on one pixel, wherein the plurality of directions are four directions, i.e., vertical, horizontal and two diagonal directions; and the edge determining module may determine that a corresponding pixel is the edge when it is determined that each pixel is the edge in at least one of the four directions.

The edge determining module may serve to include an edge determining flag determining whether each pixel corresponds to the edge in piece of information of each pixel of the image.

The sigma filter module may compare values obtained by multiplying the average brightness of the entire region of the low pass filtered image by coefficients each having a different value with the average brightness in the mask region having a predetermined size to select the filter having the flexible size to be applied to the mask region.

According to another aspect of the present invention, there is provided a method of reducing noise, including: (a) determining whether each pixel of an image corresponds to an edge; (b) performing low pass filtering of the image in two directions, i.e., vertical and horizontal directions and performing low pass filtering only for the pixel determined not to be the edge; (c) selecting a filter having a flexible size to be applied to a mask region for each of the images low pass filtered in the two directions based on the average brightness of the entire region and the average brightness of the mask region having a predetermined size; (d) sigma filtering the mask region using the selected filter for each of the images low pass filtered in the two directions; and (e) averaging the image sigma filtered in the two directions.

Step (a) may include determining whether each pixel corresponds to the edge in a plurality of directions based on one pixel, wherein the plurality of directions are four directions, i.e., vertical, horizontal and two diagonal directions; and step (a) may include determining that a corresponding pixel is the edge when it is determined that each pixel is the edge in at least one of the four directions.

Step (a) may include providing an edge determining flag for determining whether each pixel corresponds to the edge in pieces of information of each pixel of the image.

The step (c) may include comparing values obtained by multiplying the average brightness of the entire region of the low pass filtered image by coefficients each having a different value with the average brightness in the mask region having a predetermined size to select the filter having the flexible size to be applied to the mask region.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will be described in detail with reference to the accompanying drawings.

Figure 1:
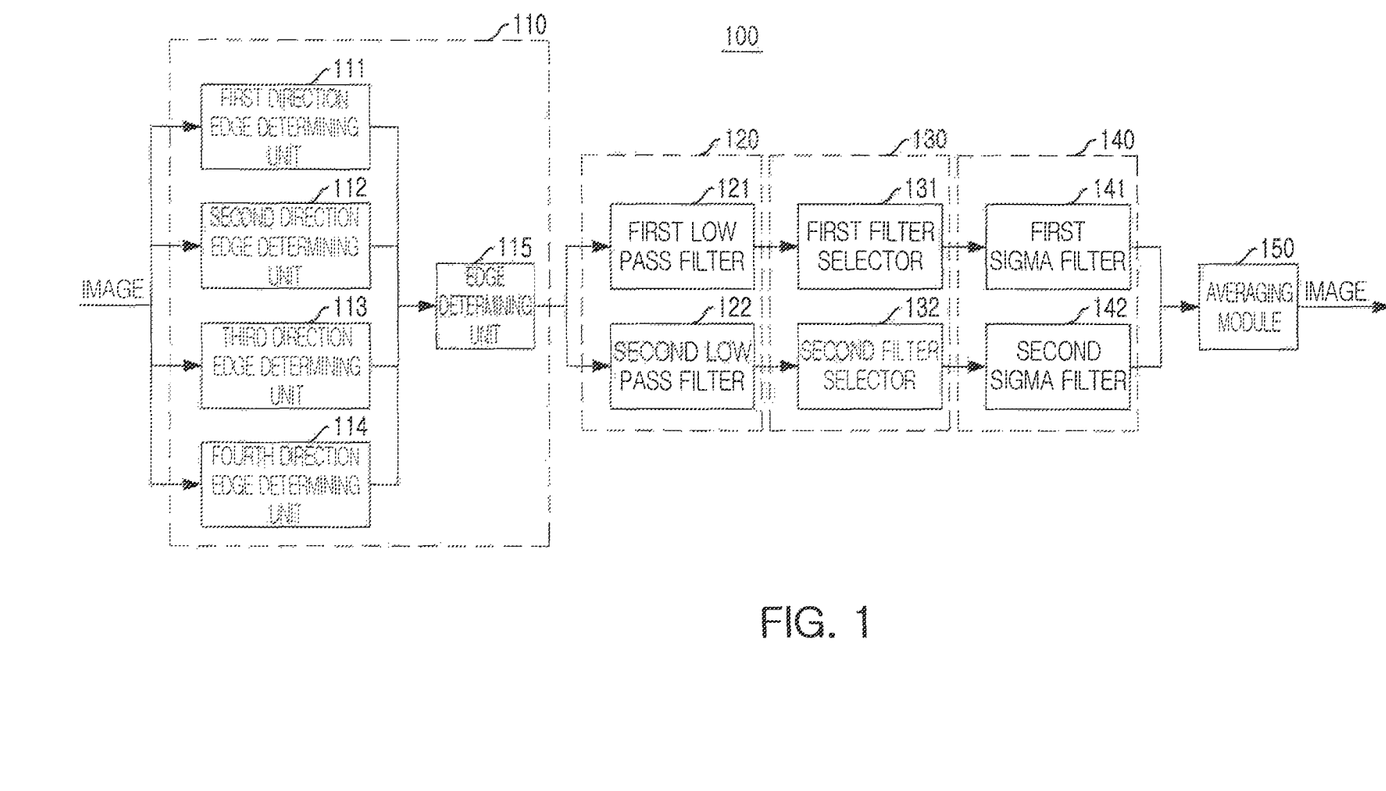
FIG. 1 is a block diagram of an apparatus of reducing noise according to an exemplary embodiment of the present invention.
Figure 3:
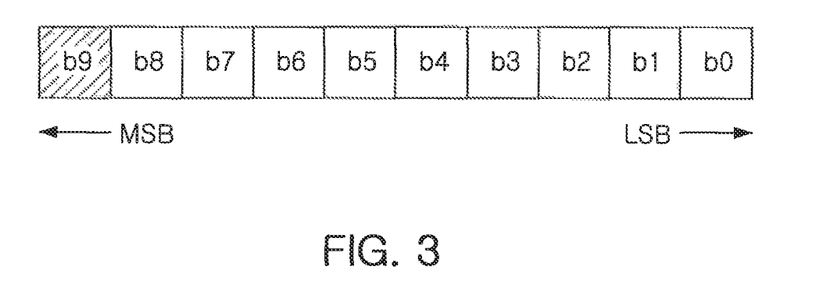
FIG. 3 shows an edge determining flag included in information of a pixel determined to be an edge according to an exemplary embodiment of the present invention.
Figure 4A:
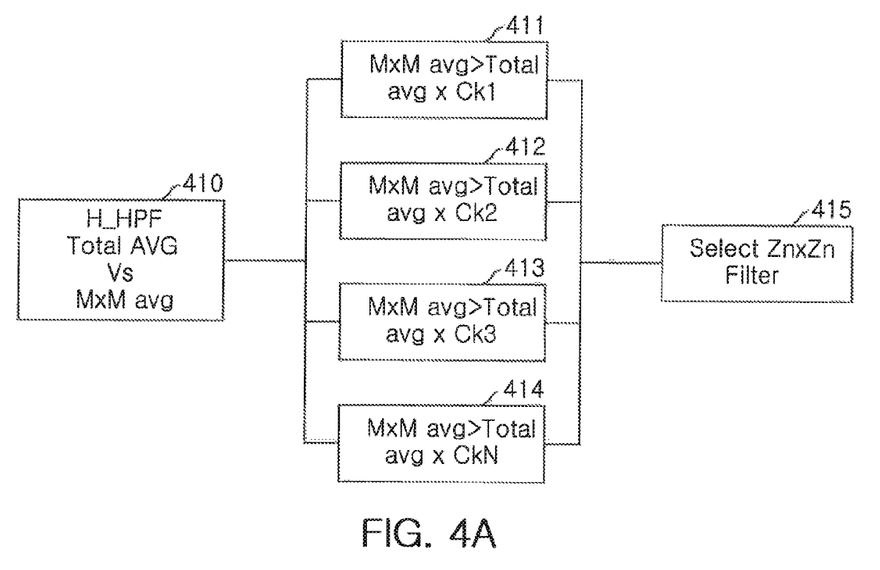
FIGS. 4A to 4B are diagrams showing a method of selecting a filter having a predetermined size in a filter selecting module according to an exemplary embodiment of the present invention.
Figure 4B:
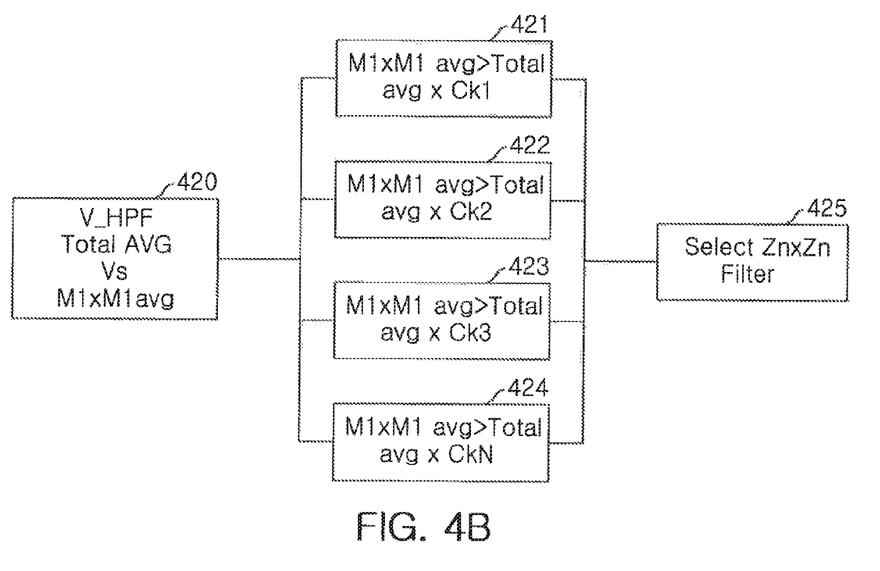
Figure 5A:
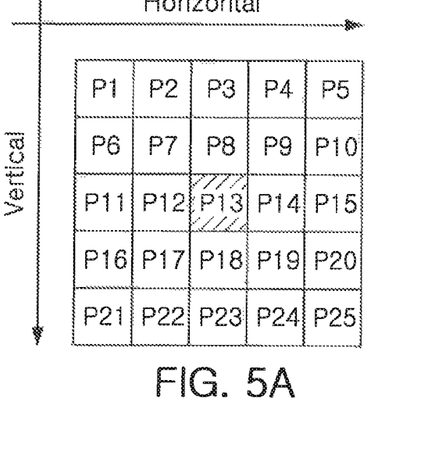
FIGS. 5A to 5D show mask regions and filters having various sizes applied thereto according to an exemplary embodiment of the present invention.
Figure 5B:
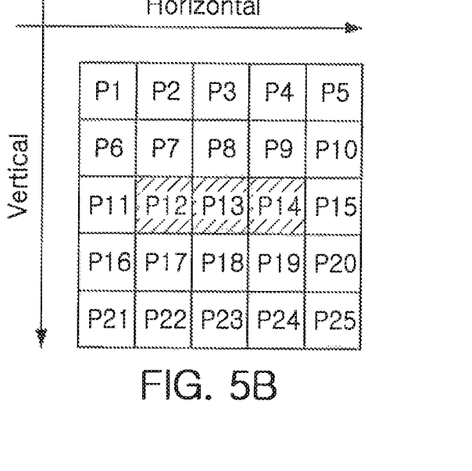
Figure 5C:
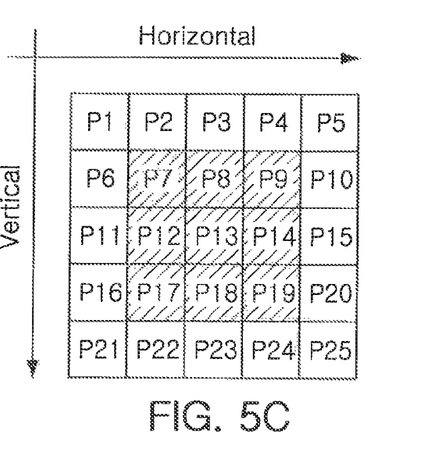
Figure 5D:
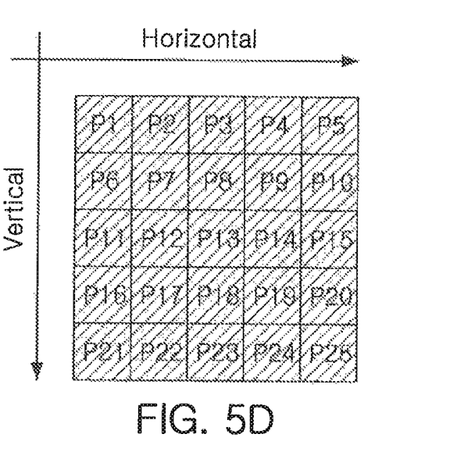

FIG. 1 is a block diagram of an apparatus of reducing noise according to an exemplary embodiment of the present invention. The apparatus 100 of reducing noise may include an edge determining module 110, a low pass filter module 120, a filter selecting module 130, a sigma filter module 140, and an averaging module 150. Meanwhile, FIGS. 2A to 2D show filters used in the edge determining module 110 in FIG. 1. FIG. 3 shows an edge determining flag included in information of a pixel determined to be an edge according to an exemplary embodiment of the present invention. FIGS. 4A to 4B are diagrams showing a method of selecting a filter having a predetermined size in a filter selecting module according to an exemplary embodiment of the present invention, and FIGS. 5A to 5D show mask regions and filters having various sizes applied thereto according to an exemplary embodiment of the present invention.

Referring to FIG. 1, the edge determining module 110 includes first to fourth direction edge determining units 111 to 114 and an edge determining unit 115, and determines whether each pixel corresponds to an edge in a plurality of directions based on each pixel of an input image. Filters used in the first to fourth direction edge determining units 111 to 114 are shown in FIGS. 2A to 2D.

Figure 2A:
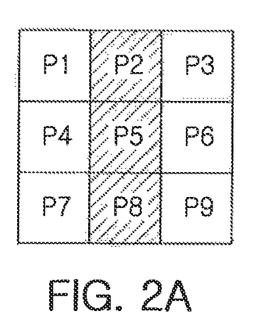
FIGS. 2A to 2D show filters for determining whether each pixel is an edge in a plurality of directions according to an exemplary embodiment of the present invention.

Specifically, the first direction edge determining unit 111 determines whether a pixel P5 corresponds to an edge using a filter in a vertical direction as shown in FIG. 2A. The determining result is transferred to the edge determining unit 115. At this time, in order to determine whether the pixel P5 corresponds to the edge, only upper and lower pixels P2 and P8 of pixels adjacent to a current pixel may be considered.

Figure 2B:
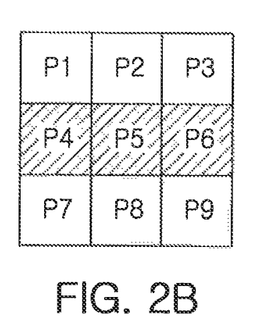

The second direction edge determining unit 112 determines whether the pixel P5 corresponds to the edge using a filter in a horizontal direction as shown in FIG. 2B. The determining result is transferred to the edge determining unit 115. At this time, in order to determine whether the pixel P5 corresponds to the edge, only left and right pixels P4 and P6 of the pixels adjacent to the current pixel may be considered.

Figure 2C:
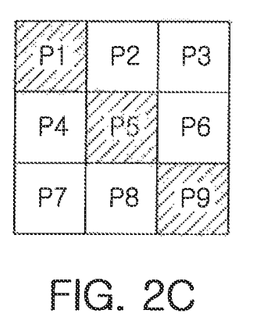

The third direction edge determining unit 113 determines whether the pixel P5 corresponds to the edge using a filter in a first diagonal direction as shown in FIG. 2C. The determining result is transferred to the edge determining unit 115. At this time, in order to determine whether the pixel P5 corresponds to the edge, only pixels P1 and P9 in a first diagonal direction of the pixels adjacent to the current pixel may be considered.

Figure 2D:
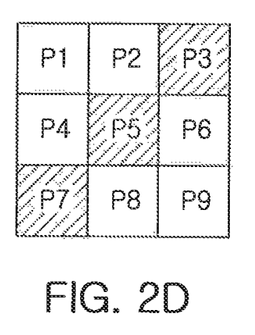

The fourth direction edge determining unit 114 determines whether the pixel P5 corresponds to the edge using a filter in a second diagonal direction as shown in FIG. 2D. The determining result is transferred to the edge determining unit 115. At this time, in order to determine whether the pixel P5 corresponds to the edge, only pixels P3 and P7 in a second diagonal direction of the pixels adjacent to the current pixel may be considered.

The filter used in the first to fourth direction edge determining units 111 to 114 may be a high pass filter for determining a high frequency component such as the edge.

Meanwhile, each of the first to fourth direction edge determining units 111 to 114 may determine whether each pixel is the edge by the following equation 1.

$$|HPF| \leq \text{reference value} \qquad \text{Equation 1}$$

Herein, |HPF| is an absolute value of a value obtained by applying the filter as shown in FIGS. 2A to 2D to each of the pixels, and the reference value indicates brightness having a predetermined value. That is, each of the first to fourth direction edge determining units 111 to 114 may determine that the current pixel is not the edge (for example, noise, and the like) in the case in which |HPF|>reference value and that it is the edge in the case in which |HPF|≤reference value.

Meanwhile, the edge determining unit 115 determines whether the current P5 corresponds to the edge, based on determination results transferred from the first to fourth direction edge determining units 111 to 114.

Specifically, the edge determining unit 115 may perform OR processing on the determination results transferred from the first to fourth direction edge determining units 111 to 114. That is, in the case in which any one of the first to fourth direction edge determining units 111 to 114 determines that the current pixel P5 is the edge, the edge determining unit 115 may determine that the current pixel P5 is the edge. According to another embodiment of the present invention, the edge determining unit 115 may perform AND processing for the determination results transferred from the first to fourth direction edge determining units 111 to 114. In this case, only when all of the first to fourth direction edge determining units 111 to 119 determine that the current pixel is the edge, the edge determining unit 115 determines that the current P5 is the edge. The OR or AND processing as described above is only an example, and may be variously modified as needed.

In addition, the edge determining unit 115 serves to include information on whether each pixel corresponds to the edge in pieces of information of each pixel of the image to transfer the information to the low pass filter module 120. Specifically, the edge determining unit 115 serves to include an edge determining flag in the information of the pixel. The description thereof will be provided with reference to FIG. 3.

FIG. 3 shows an edge determining flag included in the information of the pixel determined to be an edge according to an exemplary embodiment of the present invention.

Referring to FIG. 3, pieces of information of each pixel may be represented as 10 bits (b0 to b9). Particularly, an edge determining flag indicating that each pixel corresponds to the edge may be included in the most significant bit (MSB). For example, in the case in which the edge determining flag, which is the most significant bit (MSB), is 0, it may mean that the pixel is not the edge and in the case in which the edge determining flag is 1, it may mean that the pixel is the edge. The position of the edge determining flag as described above is only an example, and the edge determining flag may also be included in the least significant bit (LSB).

As described above, characteristics of an input image may be considered by determining whether each pixel corresponds to the edge in the plurality of directions, thereby making it possible to raise the accuracy of edge determination. In addition, the edge determining flag is included in the information of the pixel, such that the low pass filter module 120 may perform low pass filtering based on the edge determining flag.

Referring back to FIG. 1, the low pass filter module 120 includes a first low pass filter 121 and a second low pass filter 122 and performs low pass filtering of the image in two directions, i.e., vertical and horizontal directions, and performs low pass filtering only for the pixel determined not to be the edge.

Specifically, the first low pass filter 121 of the low pass filter module 120 is transferred with the edge determining flag indicating that each pixel of the image corresponds to the edge from the edge determining module 110, and performs the low pass filtering of the image in a horizontal direction based on the transferred edge determining flag. Specifically, the first low pass filter 121 does not perform the low pass filtering for the pixel having the edge determining flag of 1 (that is, the pixel which is the edge), and performs the low pass filtering for the pixel having the edge determining flag of 0 (that is, the pixel which is not the edge). The image low pass filtered in the horizontal direction is transferred to a first filter selector 131.

Likewise, the second low pass filter 122 of the low pass filter module 120 is transferred with the edge determining flag indicating that each pixel of the image corresponds to the edge from the edge determining module 110, and performs the low pass filtering of the image in a vertical direction based on the transferred edge determining flag. That is, the second low pass filter 122 does not perform the low pass filtering for the pixel having the edge determining flag of 1 (that is, the pixel which is the edge), and performs the low pass filtering for the pixel having the edge determining flag of 0 (that is, the pixel which is not the edge). The image low pass filtered in the vertical direction is transferred to a first filter selector 131.

As described above, the low pass filtering is performed only for the pixel which is not the edge, thereby making it possible to conserve energy. Therefore, it is possible to prevent the image from being blurred, thereby making it possible to obtain more sharp image.

Meanwhile, the filter selecting module 130 includes a first filter selector 131 and a second filter selector 132, and selects a filter having a flexible size to be applied to a mask region for each of the images low pass filtered in the two directions based on the average brightness of the entire region and the average brightness of the mask region having a predetermined size.

Specifically, the first filter selector 131 of the filter selecting module 130 selects a flexible filter having different sizes for each region in consideration of the brightness or direction of the image transferred from the first low pass filter 121 and low pass filtered in the horizontal direction. Information on the selected filter is transferred to a first sigma filter 141 of the sigma filter module 140.

Likewise, the second filter selector 132 of the filter selecting module 130 selects a flexible filter having different sizes for each region in consideration of the brightness or direction of the image transferred from the second low pass filter 122 and low pass filtered in the vertical direction. Information on the selected filter is transferred to a second sigma filter 142 of the sigma filter module 140.

Operation of the filter selecting module 130 will be described in detail with reference to FIGS. 4A to 5D.

FIGS. 4A to 4B are diagrams showing a method of selecting a filter having a predetermined size in a filter selecting module according to an exemplary embodiment of the present invention, and FIGS. 5A to 5D show mask regions and filters having various sizes applied thereto according to an exemplary embodiment of the present invention.

As shown in FIG. 4A, the first filter selector 131 calculates the average (H_HPF Total AVG) brightness of the entire region of the image transferred from the first low pass filter 121 and low pass filtered in the horizontal direction. In addition, the average (M×M avg) of the pixels (P1 to P25 in FIGS. 5A to 5D) included in the mask region having an M×M size (for example, 5×5 in FIGS. 5A to 5D) is calculated (410).

Then, the first filter selector 131 selects a filter having flexible size (Zn×Zn) to be applied to the mask region (5×5 in FIGS. 5A to 5D) based on the average (H_HPF Total AVG) of the pixels included in the entire region of the image low pass filtered in the horizontal direction and the average (M×M avg) of the pixels P1 to P25 included in the mask region (411 to 415). Meanwhile, the size (Zn×Zn) of the filter may be 1×1 in FIG. 5A, 1×3 in FIG. 5B, 3×3 in FIG. 5C, and 5×5 in FIG. 5D, as shown in the shaded portions in FIGS. 5A to 5D. It should be noted that these sizes of the filter are only examples and the present invention is not necessarily limited thereto.

Specifically, the first filter selector 131 may multiply the average (H_HPF Total AVG) of each of the pixels for the entire region by coefficients having various values, for example, Ck1 (411), Ck2 (412), Ck3 (413), and Ckn (414), and sequentially compare the values obtained therefrom with the average (M×M avg) of the pixels included in the mask region having an M×M size (411 to 414). According to result of this comparison, one of the filters shown in FIGS. 5A to 5D may be selected (415). For example, in the case in which M×M avg>H_HPF Total AVG×Ck1, the filter having an 1×1 size (shaded portion) shown in FIG. 5A may be selected, and in the case in which an M×M avg<H_HPT Total AVG×Ck2, the filter having a 1×3 size shown in FIG. 5B may be selected.

The operation of the first filter selector 131 as described above is equally applied to the second filter selector 132. Accordingly, for the sake of simplification, a description of reference numbers 420 to 425 will be omitted.

Meanwhile, the mask region is shown as having a 5×5 size in FIGS. 5A to 5D, however, it is only an example. Therefore, the mask region may have various sizes such as 3×3, 6×6, and the like, as needed.

Referring again to FIG. 1, the sigma filter module 140 includes a first sigma filter 141 and a second sigma filter 142, and sigma filters the mask region using the selected sigma filter for each of the images low pass filtered in the two directions.

Specifically, the first sigma filter 191 of the sigma filter module 140 sigma filters a predetermined mask region of the image low pass filtered in the horizontal direction using the filter selected by the first filter selector 131 according to Equation 2 as follows.

$$\mu - 2\sigma \leq Y(i,j) \leq \mu - 2\sigma \qquad \text{Equation 2}$$

Herein, $\mu$ indicates an average value of the sigma filtered pixels, $\sigma$ indicates a standard deviation, and Y (I, j) indicates a pixel.

Likewise, the second sigma filter 142 of the sigma filter module 140 sigma filters the mask region using the filter selected by the second filter selector 132 according to Equation 2. The second sigma filter 142 sigma filters the image low pass filtered in the vertical direction.

Finally, the averaging module 150 averages the image transferred from the first sigma filter 141 and the image transferred from the second sigma filter 142.

Figure 6:
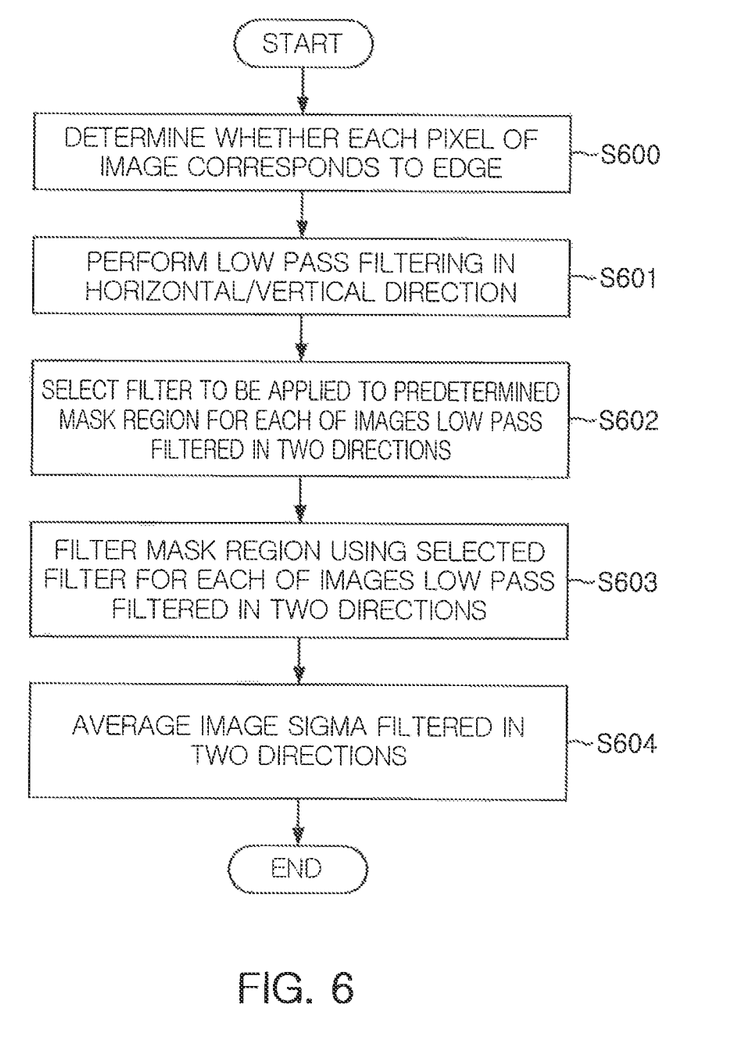
FIG. 6 is a flow chart describing a method of reducing noise according to an exemplary embodiment of the present invention.

FIG. 6 is a flow chart describing a method of reducing noise according to an exemplary embodiment of the present invention. For the sake of simplification, a description of portions overlapping with the contents described with regard to FIGS. 1 to 5 will be omitted.

In step 600, an edge determining module 110 determines whether each pixel of an image corresponds to an edge using first to fourth direction edge determining units 111 to 114 and an edge determining unit 115. Information on whether each pixel corresponds to the edge is included in an edge determining flag, which is the most significant bit (MSB) of pixel information, to be transferred to a low pass filter module 120, as shown in FIG. 3.

In step 601, the low pass filter module 120 performs low pass filtering of the image in two directions, i.e., vertical and horizontal directions, and performs low pass filtering only for the pixel determined not to be the edge. The low pass filtered image is transferred to a filter selecting module 130.

In step 602, the filter selecting module 130 selects a filter having a flexible size to be applied to a mask region for each of the images low pass filtered in the two directions based on the average brightness of the entire region and the average brightness of the mask region having a predetermined size. Information of the selected filter is transferred to a sigma filter module 140.

In step 603, the sigma filter module 140 sigma filters the mask region using the filter selected by the filter selecting module 130 for each of the images low pass filtered in the two directions. The sigma filtered image is transferred to an averaging module 150.

Finally, in step 604, the averaging module 150 averages the image sigma filtered in the two directions to output the averaged image to the outside.

As set forth above, according to exemplary embodiments of the invention, the flexible sigma filter having the different sizes for each region in consideration of the brightness or direction of the image is applied, thereby making it possible to adaptively reduce the noise.

In addition, a pre-processing process which determines whether each pixel is the edge in a plurality of directions and performs low-pass filtering only for the pixel determined not to be the edge is made, thereby making it possible to prevent loss of the edge due to blurring of the image.

While the present invention has been shown and described in connection with the exemplary embodiments, it will be apparent to those skilled in the art that modification and variation can be made without departing from the spirit and scope of the invention as defined by the appended claims.

What is claimed is:

1. An apparatus for reducing noise, the apparatus comprising:
    an edge determining module configured to determine whether or not each pixel of an image corresponds to an edge;
    a low pass filter module configured to perform low pass filtering of the image in a horizontal direction and a vertical direction and to perform the low pass filtering only for the pixel determined not to correspond to the edge;
    a filter selecting module configured to select a filter having a flexible size to be applied to a mask region for each image low pass filtered in the horizontal direction and the vertical direction based on an average brightness of an entire region and an average brightness of the mask region having a predetermined size;
    a sigma filter module configured to sigma filter the mask region using the selected filter for each image low pass filtered in the horizontal direction and the vertical direction; and
    an averaging module configured to average the image sigma filtered in the horizontal direction and the vertical direction.

2. The apparatus of claim 1, wherein the edge determining module is configured to determine whether or not each pixel corresponds to the edge in a plurality of directions based on one pixel.

3. The apparatus of claim 2, wherein
    the plurality of directions include a vertical direction, a horizontal direction, and two diagonal directions, and
    the edge determining module is configured to determine that a corresponding pixel is the edge when it is determined that each pixel is the edge in at least one of the vertical direction, the horizontal direction, and the two diagonal direction.

4. The apparatus of claim 1, wherein the edge determining module is configured to serve to include an edge determining flag configured to determine whether or not each pixel corresponds to the edge in pieces of information of each pixel of the image.

5. The apparatus of claim 1, wherein the sigma filter module is configured to compare values obtained by multiplying the average brightness of the entire region of the low pass filtered image by respective coefficients each having a different value with the average brightness in the mask region having the predetermined size and to select the filter having the flexible size to be applied to the mask region.

6. A method of reducing noise, the method comprising:
    (a) determining whether or not each pixel of an image corresponds to an edge;
    (b) performing low pass filtering of the image in a horizontal direction and a vertical direction and performing the low pass filtering only for the pixel determined not to correspond the edge;
    (c) selecting a filter having a flexible size to be applied to a mask region for each image low pass filtered in the horizontal direction and the vertical direction based on an average brightness of an entire region and an average brightness of the mask region having a predetermined size;
    (d) sigma filtering the mask region using the selected filter for each image low pass filtered in the horizontal direction and the vertical direction; and
    (e) averaging the image sigma filtered in the horizontal direction and the vertical direction.

7. The method of claim 6, wherein the step (a) includes determining whether or not each pixel corresponds to the edge in a plurality of directions based on one pixel.

8. The method of claim 7, wherein the plurality of directions include a vertical direction, a horizontal direction, and two diagonal directions; and
    the step (a) includes determining that a corresponding pixel is the edge, when it is determined that each pixel is the edge in at least one of the vertical direction, the horizontal direction, and the two diagonal direction.

9. The method of claim 6, wherein the step (a) includes providing an edge determining flag configured to determine whether or not each pixel corresponds to the edge in pieces of information of each pixel of the image.

10. The method of claim 6, wherein the step (c) includes comparing values obtained by multiplying the average brightness of the entire region of the low pass filtered image by respective coefficients each having a different value with the average brightness in the mask region having the predetermined size and selecting the filter having the flexible size to be applied to the mask region.

* * * * *